(12) United States Patent
Putilin et al.

(10) Patent No.: US 6,985,290 B2
(45) Date of Patent: Jan. 10, 2006

(54) VISUALIZATION OF THREE DIMENSIONAL IMAGES AND MULTI ASPECT IMAGING

(75) Inventors: Andrey N. Putilin, Moscow (RU); Andrew Lukyanitsa, Moscow (RU)

(73) Assignee: NeurOK LLC, McLean, VA (US)

( * ) Notice: Subject to any disclaimer, the term of this patent is extended or adjusted under 35 U.S.C. 154(b) by 102 days.

(21) Appl. No.: 10/751,654

(22) Filed: Jan. 6, 2004

(65) Prior Publication Data

US 2004/0223218 A1  Nov. 11, 2004

Related U.S. Application Data

(63) Continuation-in-part of application No. 09/977,462, filed on Oct. 15, 2001, now Pat. No. 6,717,728, which is a continuation-in-part of application No. 09/456,826, filed on Dec. 8, 1999, now abandoned.

(60) Provisional application No. 60/527,827, filed on Dec. 9, 2003, provisional application No. 60/437,991, filed on Jan. 6, 2003.

(51) Int. Cl.
*G02B 27/22* (2006.01)
*G03B 21/56* (2006.01)
*G03B 21/00* (2006.01)
*G03B 21/26* (2006.01)

(52) U.S. Cl. .................. 359/462; 359/443; 359/449; 359/460; 353/7; 353/30

(58) Field of Classification Search ............... 359/462, 359/443, 449, 460; 353/7, 30; 345/6
See application file for complete search history.

(56) References Cited

U.S. PATENT DOCUMENTS

| 4,792,850 A | * | 12/1988 | Liptoh et al. | .................. | 348/57 |
| 5,264,964 A | * | 11/1993 | Faris | ........................... | 359/465 |
| 5,945,965 A | * | 8/1999 | Inoguchi et al. | ................ | 345/6 |
| 6,252,707 B1 | * | 6/2001 | Kleinberger et al. | ......... | 359/465 |

* cited by examiner

*Primary Examiner*—Judy Nguyen
*Assistant Examiner*—Magda Cruz
(74) *Attorney, Agent, or Firm*—Hogan & Hartson L.L.P.

(57) ABSTRACT

Three-dimensional imaging without parallax barriers or specialized eye gear, and without attendant loss of resolution, is provided by a display that produces dynamic images for display on at least two stacked electronic transmissive displays to create a continuous 3-D image field in a large viewing area or in multiple viewing areas. The images on each display are derived from stereoscopic image sources corresponding to both eyes of a viewer, and the derived images act as a mask for each other causing 3-D perception. The derived images are processed by summing the predicted image data, comparing the predicted image data to the desired stereopair, and minimizing the error. In preferred embodiments, the processing can be performed by an artificial neural network. A viewer may be presented with different aspects of an image as their viewing position changes to allow the viewer to perceive various perspectives of an image in dynamic fashion.

32 Claims, 9 Drawing Sheets

VISUALIZATION OF THREE DIMENSIONAL IMAGES AND MULTI ASPECT IMAGING

CROSS REFERENCE TO RELATED APPLICATIONS

The present Application is a Continuation-in-Part of U.S. patent application Ser. No. 09/977,462, filed Oct. 15, 2001, now U.S. Pat. No. 6,717,728, which in turn is a Continuation-in-Part of U.S. patent application Ser. No. 09/456,826, filed Dec. 8, 1999 now abandoned, both of which are incorporated herein by reference in their entirety. The present Application also claims the benefit of priority from U.S. Provisional Patent Application Serial No. 60/437,991, filed Jan. 6, 2003, and U.S. Provisional Patent Application Ser. No. 60/527,827, filed Dec. 9, 2003 titled "Apparatus for Visualization of Stereo and Multi Aspect Images".

FIELD OF THE INVENTION

This invention relates generally to the display of three dimensional and multi-viewer and multi-aspect images and related apparatus. More specifically, the present invention pertains to three-dimensional visualization and multi-viewer and multi-aspect imaging employing parallel information processing of known images.

BACKGROUND OF THE INVENTION

Objects are seen in three dimensions because light reflects from them and generates a light field in space. The two eyes of a viewer perceive this light field differently due to their different locations in space relative to the object, and the brain of the viewer processes the different perceptions of the light field by the two eyes to generate three-dimensional perception. If a second light field (LF') is recreated that is the same as a first, original light field (LF), the viewer of LF' will see the same object image in three dimensions. The basic quality of any three-dimensional imaging system therefore depends on the magnitude of the difference between LF and LF', i.e., how close the imaging system can come to recreating LF.

Stereoscopic imaging is one well-known technique that simulates three-dimensional ("3-D") images to humans by providing differing images of the same object or scene to the left and right eyes of the viewer. The principles of stereoscopic imaging have been applied to various areas for many years, including to the training of professionals, such as pilots to physicians, and to entertainment, such as 3-D movies and computer games. All of these systems rely upon segregating images for the right and left eyes. For example, an apparatus which sequentially displays different views to the left and right eye of a viewer has been used successfully in cartographic and other applications. In this instance, using stereo image alternation, a different view is sequentially presented to the left and right eye of the viewer. Stereographic effects have also been created by using cathode ray tubes or liquid crystal displays whereby a viewer wears special glasses such as polarizing glasses or liquid crystal shutter glasses in order to see a different image in the left and right eye. Stereoscopic imaging systems have suffered from an inability to allow multiple image views or aspects to a single viewer and to multiple viewers without expensive or cumbersome specialized eye gear or goggles.

Lenticular lenses and screens are one common technological approach that has been used to allow a viewer to see a left eye and right eye image separately without the need for specialized eye gear. For example, U.S. Pat. No. 5,838,494 to Araki describes a lenticular screen system that displays a plurality of striped images behind a corresponding lenticular screen or striped barrier such that a viewer sees with each particular eye only the image stripes that correspond to the appropriate parallax view for the left or right eye when the user is looking through the lenticular screen. Inherently, such lenticular lens and screen systems like this apparatus present only a limited number of different or varying image views to a viewer as the lenticular lens is placed between the viewer and the image and inherently limits the amount of image information that can reach the viewer's eyes. One screen, or plane, contains all of the information about the image or images while the other screen (or mask), placed between the imaging screen and viewer, contains only the lenticular lens or running slits that isolates the left eye image from the right eye image for the viewer. Whenever a viewer uses a parallax barrier-type of 3-D viewing system, the viewer is actually seeing the parallax barrier or the lenticular lens. The viewer is therefore unable to change position freely to "look around" the object image or change perspective as the viewer could in real life.

Various modifications have been made to the standard stereoscopic display systems in order to improve image quality and improve utility of the systems. For example, U.S. Pat. No. 5,930,037, issued to Imai, describes a lenticular lens stereoscopic image system that has mechanisms to prevent inverse stereoscopic viewing (when the right eye sees the image that is destined for the left eye and vice versa). While this invention addresses the particular problem of inverse stereoscopic viewing, this invention does not solve the problem of limited image views and aspects.

Similarly, U.S. Pat. No. 5,712,732, issued to Street, describes an improvement upon the lenticular screen system that provides a mechanism that electronically solves the problem that, when a lenticular lens is used, a viewer must be at a particular distance from and orientation to the lens in order for the lens to operate correctly. This invention comprises an automated measuring apparatus allowing a 3-D imaging system to determine the position of the viewer's head in terms of distance and position (e.g., left-right) relative to the screen. In this fashion an appropriate stereographic image pair can be presented to the user at any particular location. Again this invention relies upon a lenticular screen to separate the parallax views for the left and right eye of the viewer. The head location apparatus dictates various other geometries associated with viewing the stereographic pairs of an image. However, while this invention relates to adapting for the location of the viewer's head during parallax image viewing, it does not provide an ability to increase the number of aspects of an image that can be created and viewed, nor does it provide an ability to provide such multi-aspect images to multiple viewers simultaneously.

It would be desirable to have a 3-D imaging system that provides numerous aspects, perspectives or views to a given user or multiple users in a dynamic manner. It would further be useful for such viewing to take place in a flexible way so that the viewer is not constrained in terms of the location of the viewer's head when seeing the stereo image.

SUMMARY OF THE INVENTION

In light of the above drawbacks in the prior art, it is an object of the present invention to provide for multi aspect image viewing to create dynamic 3-D image effects viewable by one or more viewers.

It is further an object of the present invention to be able to present an unlimited number of aspects of an image to a viewer so as to approximate a full 3-D viewing experience without losing any image information or quality.

It is another object of the present invention to provide the ability to generate and display 3-D images in a dynamic manner suitable for interactive and real-time applications by removing sources of error and distortion from the generating and viewing of stereographic images.

Additionally, it is an object of the present invention to provide systems and methods for 3-D imaging that improve 3-D image quality and maximize image information to the viewer. Likewise, it is a related object of the present invention to eliminate the need for masks or obstructions from the image path of viewers when reviewing stereo imagery. Similarly, it is an object of the present invention to eliminate the need for a parallax barrier or lenticular screen within the view path of viewers trying to visualize a 3-D scene or object.

The present invention is a system and method for three-dimensional visualization based upon parallel information processing of stereo and multi aspect images. The images can be processed for a single 3-D viewing zone or multiple 3-D viewing zones for multiple users. Preferably, the processing according to embodiments of the present invention is adaptive in nature so as to be continually re-processed as the location of a given viewer or viewers changes. Thus the perception of 3-D images by any given viewer is improved by not constraining the viewer in any meaningful way.

In embodiments of the present invention, at least two transmissive electronic display screens are positioned one behind another. Each such screen is composed of multiple pixels or cells that collectively are capable of forming an image. Although the transmissive electronic display screens will be referred to hereinafter as LCDs (liquid crystal displays), the present invention is not meant to be limited to LCDs and can use other transmissive electronic display means, such as, but not limited to, plasma displays, and OLED (organic light emitting diodes) or OLEP (organic light emitting polymer) screens. The screens are transmissive, i.e., they each transmit light. An illumination source is positioned behind the screens to illuminate the images created on each screen.

In alternative embodiments of the invention, a separate mask panel can be included between the LCD panels so as to increase the image quality and suppress Moiré patterns.

Unlike prior art systems that use a pair of screens to display a right and left stereographic image pair or aspect (hereafter called stereopair), each screen of the present invention displays a calculated image that is not one of the stereopair images, but is rather a derivative of the stereopair images that interact in the present design to produce collectively the stereo image to be viewed. The information is derived from a database of stereopairs stored in a memory unit or other suitable source of base images. A memory unit provides a desired stereopair to the processor, which in turn processes the calculated images to be displayed by the LCD panels. Further, the processor controls a lighting unit that illuminates the LCD panels in order to produce the desired images.

To calculate the derivative images for each panel in embodiments of the invention, the processor estimates the light directed to each one of a viewer's eyes by calculating interim calculated images for each of said transmissive electronic display panels, and then determines the light directed through each discrete pixel of said front transmissive electronic display. The processor then compares the estimated light for each pixel with the equivalent light from the selected ones of the original source stereopair images to determine an error, and then adjusts the interim calculated images as appropriate to reduce the error in order to keep the error for each pixel is below a set limit. Preferably, the calculation of and refining of the derivative images is performed by an artificial neural network.

In embodiments of the invention, the calculated image in each panel acts as a mask for the image(s) of the other panel(s). Thus, the viewer sees no images other than the object itself, in contrast to conventional parallax barrier-type imaging systems, where the mask can clearly be seen. Such generating of the 3-D image results in the absence of noise and distortion of a visual nature such as that created by lenticular screens or lenses.

According to embodiments of the present invention, since the 3-D image information is distributed between the LCD panels, there is no loss of resolution as produced in prior art systems where image information for both eyes is displayed on a single screen or plane behind a lenticular screen or lens.

In certain embodiments of the invention, the calculated images are presented to one or more viewers based upon a sensing of one ore more viewer's positions. This viewer position signal is generated and sent to the processor by means known in the art, such as by an infrared ("IR") position sensor or radio frequency ("RF") or ultrasonic position tracking sensor, where the processor then in turn retrieves an appropriate image stereopair from the image source for subsequent processing, presentation, and display by the controller of the transmissive displays. Further, in preferred embodiments of the invention, viewer position sensors are utilized to present a viewer with different aspects of an image as their viewing position changes so as to allow the viewer to view various perspectives of an image in dynamic fashion. The present invention thereby is capable of creating a continuous 3D image field in a large viewing area with improved image quality, as opposed to a discrete, stationary set of stereo viewing zones where the image quality greatly deteriorates as the number of viewing zones increases.

BRIEF DESCRIPTION OF THE DRAWINGS

The accompanying drawings, which are included to provide further understanding of the invention and are incorporated in and constitute part of this specification, illustrate embodiments of the invention and together with the description serve to explain the principles of the invention. In the drawings.

DETAILED DESCRIPTION OF THE PREFERRED EMBODIMENTS

As noted above, the present invention comprises systems and related methods for presenting multiple aspects of a stereoscopic image to create a three-dimensional viewing experience by using multiple stacked electronic transmissive displays, such as liquid crystal panels. The present invention provides a system and method for presentation of 3-D images for viewing within large and continuous viewing zones where the images are created dynamically with a plurality of display panels.

Figure 1:
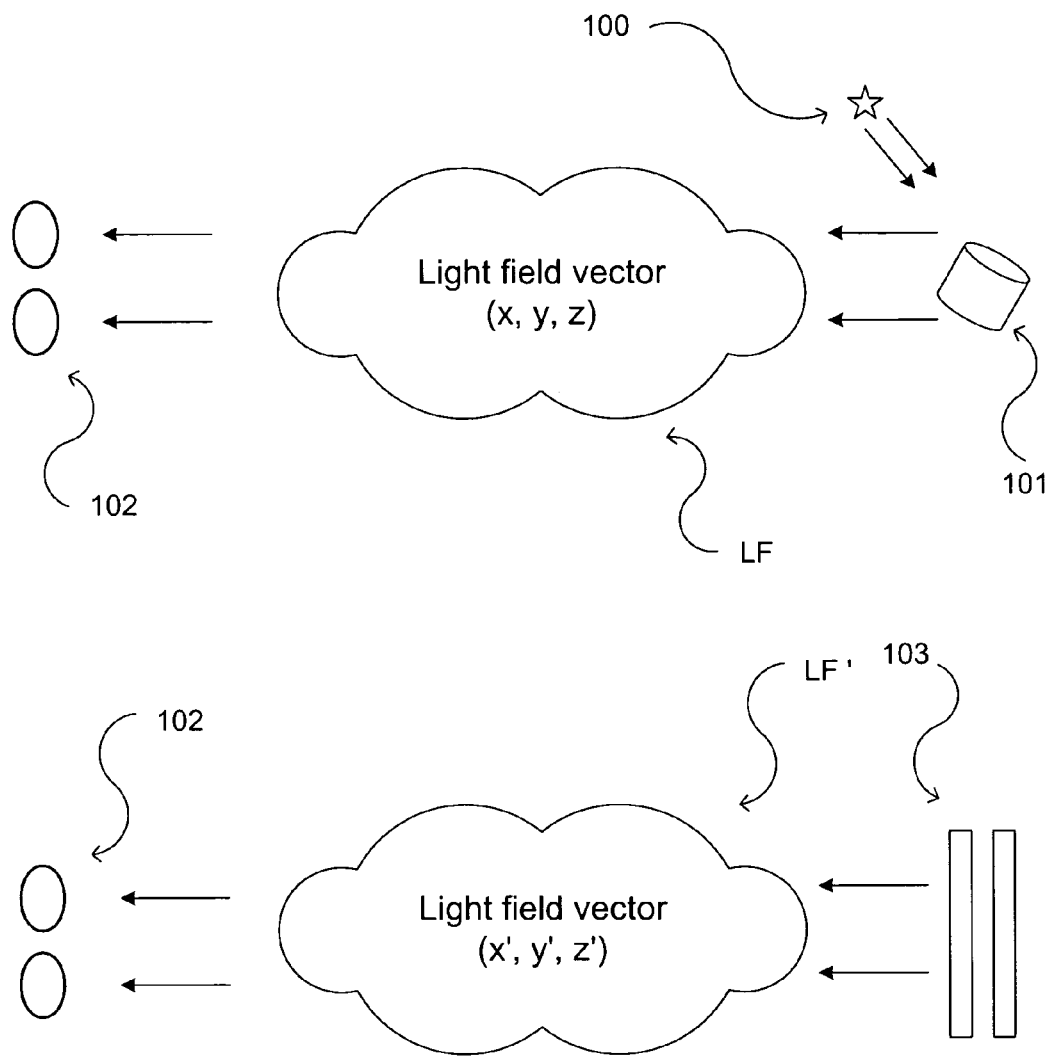
FIG. 1 is a schematic diagram illustrating 3-D light fields created by a real object and illustrating the recreation of such light fields.

FIG. 1 illustrates how humans can see real objects in three dimensions as light 100 reflects from an object 101 and generates a light field LF in space. The two eyes 102 of a viewer perceive this light field differently due to each eye's different location in space relative to the object, and the brain of the viewer processes the different perceptions of the light field by the two eyes to generate three-dimensional perception. FIG. 1 also shows a second light field LF' being formed from the electronic transmissive displays 103 of a 3-D display system whereby LF' is nearly identical to LF and creates a second perceived 3-D image. The basic quality of any three-dimensional imaging system depends on the magnitude of the difference between LF and LF', i.e., how close the imaging system can come to recreating LF. If the second light field LF' is recreated to be nearly the same as the original light field LF, the viewer of LF' will perceive the same object image in three dimensions.

Figure 2:
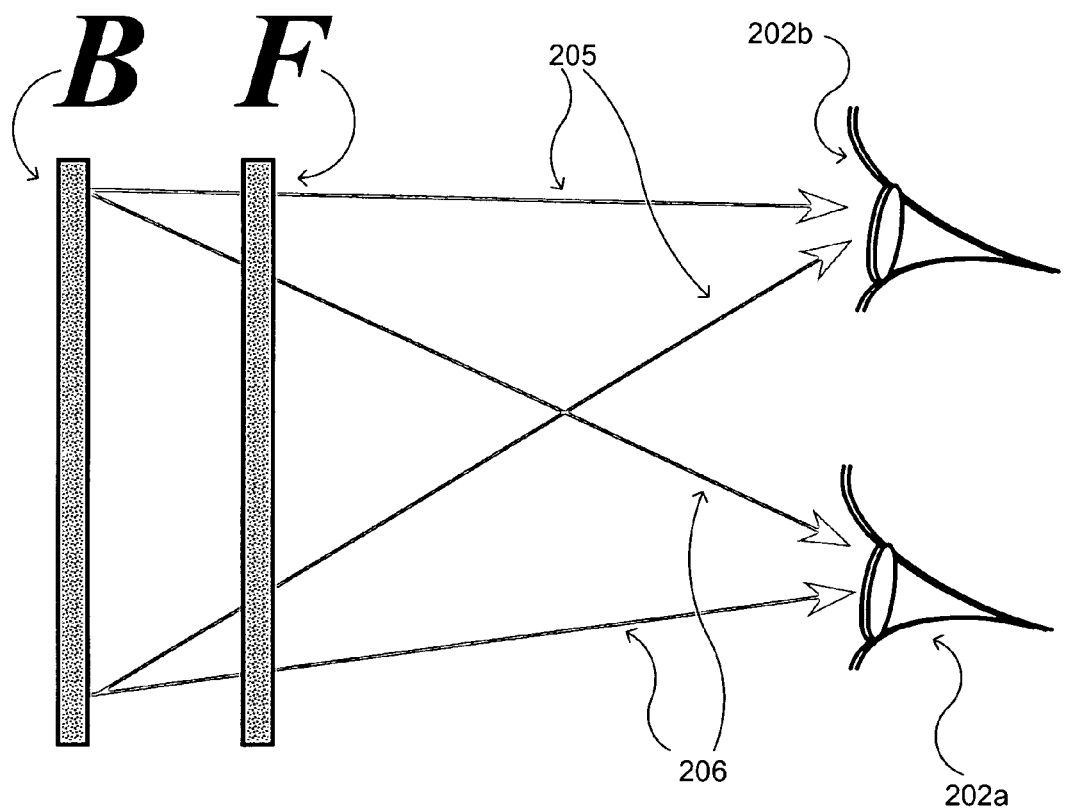
FIG. 2 is a schematic diagram depicting the orientation of a viewer with respect to the display panels in order to generate 3-D images in embodiments of the invention.

The present invention utilizes two or more stacked transmissive display panels 103 as shown in FIG. 1, but with each panel cooperating to display derivative images of the stereopair images that are desired to be displayed to the viewer's two eyes. The derivative images interact and effectively mask one another to produce collectively the stereo image to be viewed. As shown in FIG. 2, transmissive display panels in embodiments of the present invention are stacked in orientation relative to the viewer (viewer position denoted in FIG. 2 by the left and right eye 202a and 202b, respectively). As depicted in the Figure, each eye 202a and 202b has a different view path to the back B and front F panels (as shown by view lines 205 and 206), which view path causes the images on the panels to be summed together and perceived by the viewer as stereoscopic images for the eyes 202a and 202b.

Figure 3:
FIG. 3 is an illustration of exemplary calculated images that could be displayed on the display panels of FIG. 2 to generate 3-D images.
Figure 3:
Figure 4:
FIG. 4 is an illustration of exemplary perceived 3-D images that could be seen by a viewer when the images of FIG. 3 are displayed on the display panels of FIG. 2.
Figure 4:

FIG. 3 illustrates an example of such derivative images 301 and 302 adapted for the back panel B and front panel F, respectively. As depicted in the Figure, the derivative images displayed on each of the panels can appear blurred and chaotic when viewed independently and separately. However, when viewed simultaneously with the panels B and F in the proper orientation as depicted in FIG. 2, the derivative images will produce appropriate stereoscopic images 401 and 402 for the left and right eyes of the viewer, respectively, as depicted in FIG. 4.

To calculate the derivative images for each panel in embodiments of the invention, the processor estimates the light directed to each one of a viewer's eyes by calculating interim calculated images for each of said transmissive electronic display panels, and then determines the light directed through each discrete pixel of said front transmissive electronic display. The processor then compares the estimated light for each pixel with the equivalent light from the selected ones of the original source stereopair images to determine an error, and then adjusts the interim calculated images as appropriate to reduce the error in order to keep the error for each pixel is below a set limit.

In accordance with an embodiment of the invention, an iterative algorithm evaluates the differences between the generated images and the original image. Based on the differences between them, the algorithm dictates screen imaging adjustments. These screen adjustments cause changes to the generated images making them more identical replicas of the original (i.e. approaching maximum exactness). For example, this iterative process can require several iterations, such as 3 to 7 iterations, to render each frame within acceptable error.

Figure 5:
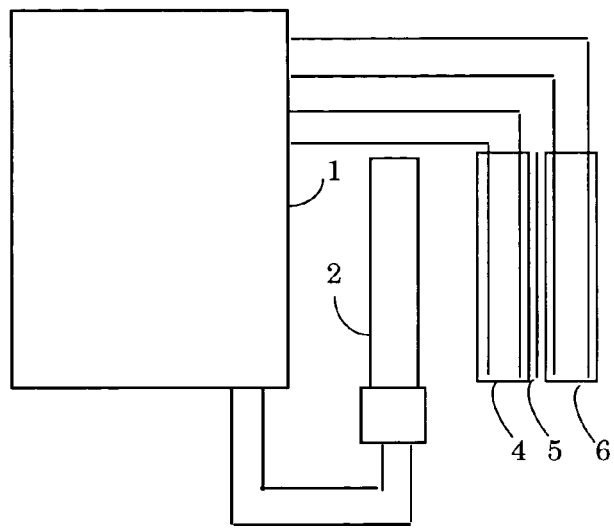
FIG. 5 is a schematic diagram illustrating components of a display system in accordance with an embodiment of the invention.

FIG. 5 shows the basic components of a display system in accordance with an embodiment of the invention. In the Figure, a distant and nearest (hereinafter called near) transmissive display screens 4 and 6 (which may be transmissive liquid crystal displays) are separated by a gap in which, in this embodiment, a spatial mask 5 is placed. This mask may be pure phase (e.g., lenticular or random screen), amplitude or complex transparency, including another transmissive display. The screens are controlled by a computing device 1, such as a personal computer, a video controller, or other suitable digital processing device. As will be discussed in detail below, the display system depicted relies on the calculation of images by the computer 1 that are then displayed on the distant and near screens 4 and 6 to produced perceived stereo images in the viewer eyes.

Figure 6:
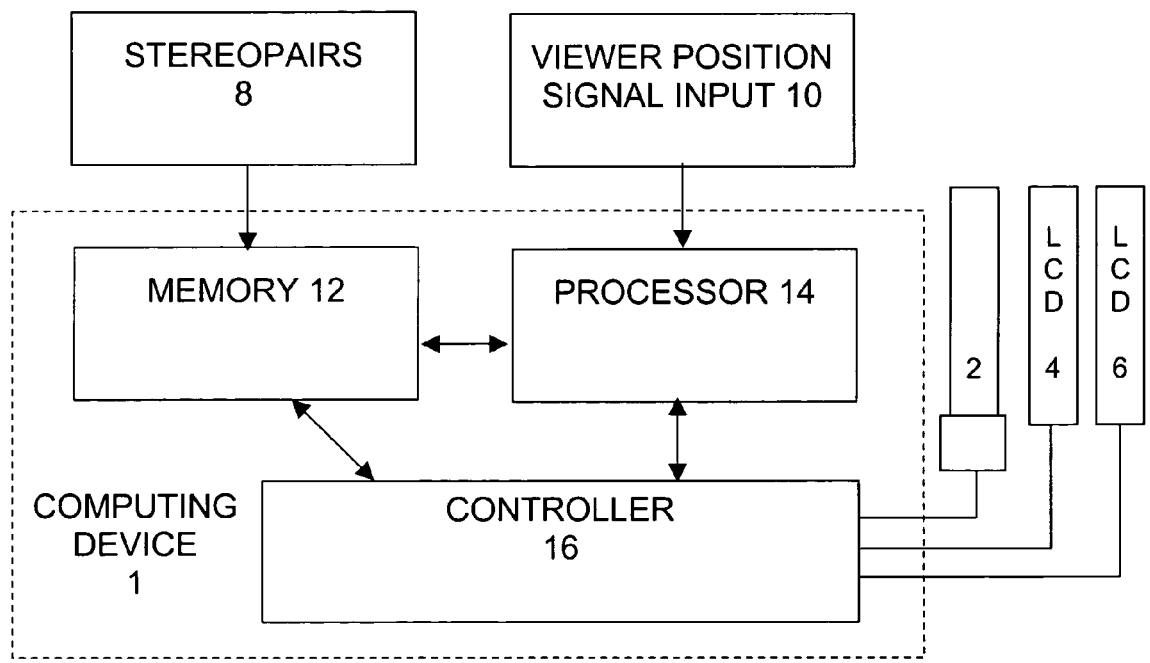
FIG. 6 is a schematic diagram illustrating the computational and control architecture utilized to generate 3-D images in accordance with one embodiment of the invention.

FIG. 6 illustrates the detail for the computing device 1, depicting the computational and control architecture utilized to generate 3-D images in accordance with that embodiment of the invention. Although disclosed in this embodiment as including a viewer position signal input 10, it will be understood by one of skill in the art that the invention can also be practiced without this feature by defining a set viewing zone or multiple set viewing zones, as discussed in the example below. The invention comprises a database of stereopairs or aspects which are also provided as an input 8 to the memory unit 12. Memory unit 12 has several functions. Initially memory unit 12 will extract and store a particular stereopair from the input 8 source (such as a database in memory or storage). This stereopair will correspond to an initial viewing position. As noted above, a viewer position sensor 10 can provide a viewer position signal to processor 14.

Generally, a minimum of two image information streams, corresponding to left eye and right eye images, are needed to generate a 3-D image in embodiments of the present invention. While above it was stated that the stereopair source images could be stored in and retrieved from a database in another memory or storage location (including stored previously in memory 12), the source image information may come ultimately from a variety of sources. For example, the information streams may include one or more pairs of camcorders or paired video streams for live 3-D video or recorded 3-D video, left and right images of one object (e.g., for photos) and left and right views from 3-D scene (e.g., for games).

All during the viewing session, the viewer position signal 10 is constantly monitored and provided to processor 14. Depending upon the viewer position and subsequent error processing as noted (below), information from processor 14 regarding viewer position 10 (or preset location of the user for stationary viewing zones) is provided to memory 12 for subsequent extraction of the stereopair aspects from the database and recalculation of derived images for the displays 4 and 6. Thus the present invention can constantly provide an updated series of stereopairs to the processor based upon the input viewer position signal if the viewer desires to see the 3-D object from various positions. If the viewer desires to see a single 3-D view of an object, regardless of the viewing position, the viewer position signal input 10 can be used to determine the optical geometry used in the required processing. As will be readily appreciated by one skilled in the art, multiple viewer position signals can similarly be used to created multiple viewing zones (including with different images or image aspects) as is described below.

Memory 12 provides the desired stereopair to the processor 14 to produce calculated images. The calculated images can be directly sent from processor 14 to LCD panel and lighting unit control 16 or stored in memory 12 to be accessed by control unit 16. Unit 16 then provides the calculated images to the appropriate LCD panels 4 and 6 as well as controls the lighting that illuminates the transmissive LCD panels 4 and 6. Processor 14 can also provide instructions to LCD and lighting control unit 16 to provide the appropriate illumination.

It should be noted that memory 12 holds the accumulated signals of individual cells or elements of the liquid crystal display. Thus the memory unit 12 and processor 14 have the ability to accumulate and analyze the light that is traveling through relevant screen elements of the LCD panels toward the right and left eyes of the viewer which are identified by the processor 14 based upon the set viewing zone(s) or the viewer position signal 10.

Figure 7:
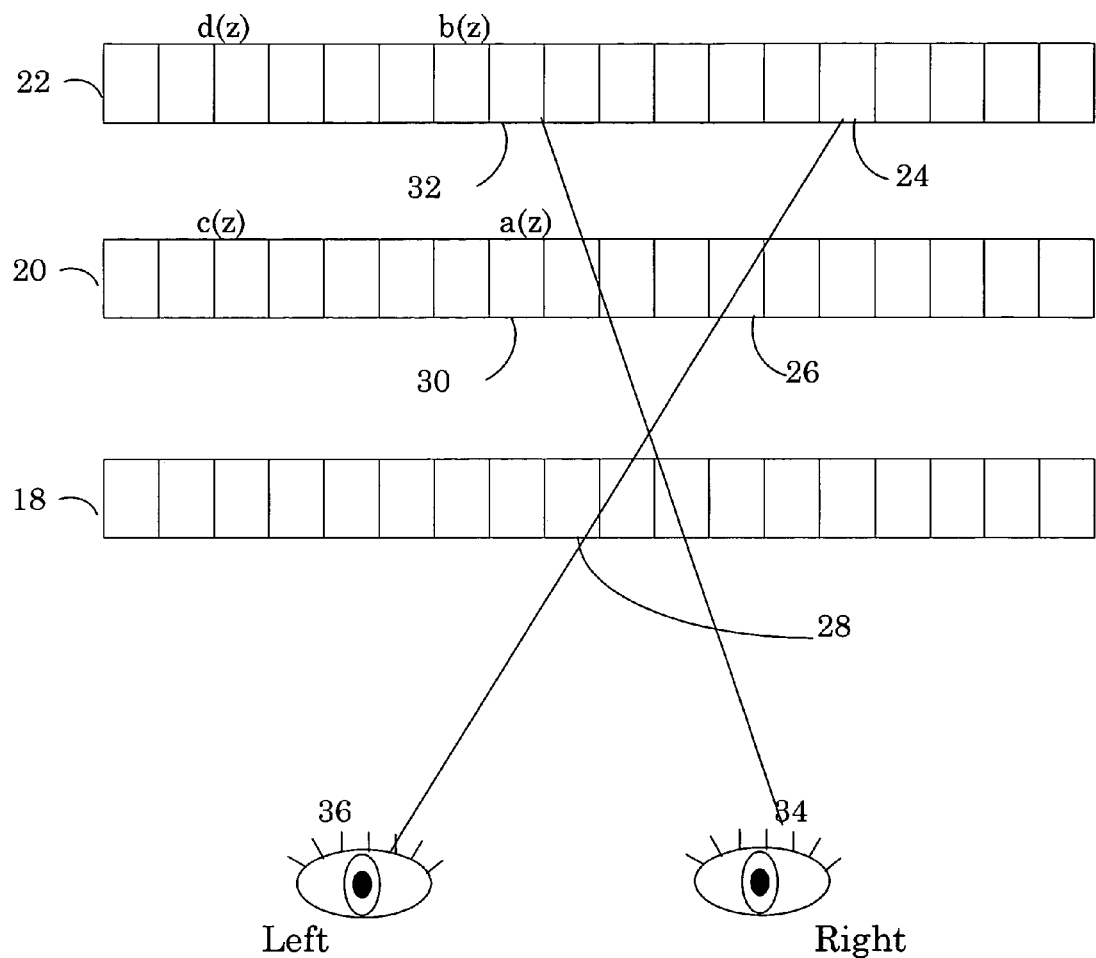
FIG. 7 is a schematic diagram that depicts the light beam movement from display panels to a viewer's eyes in accordance with embodiments of the invention.

FIG. 7 schematically depicts the light beam movement from display panels to a viewer's eyes. As illustrated in FIG. 7, two light beams will come through the arbitrary cell z 28 on the near screen 18 in order to come through the pupils of eyes 34 and 36. These beams will cross mask 20 and distant screen 22 at the points a(z) 26 and c(z) 30, b(z) 24 and d(z) 32, respectively. The image in the left eye 36 is a summation of:

$$SL_z = N_z + M_{a(z)} + D_{b(z)}.$$

where N is the intensity of the pixel on the near screen 18, M is the intensity of the pixel on the mask 20, and D is the intensity of the pixel on the distant screen 22.

For right eye 34, respectively, the summation is:

$$SR_z = N_z + M_{c(z)} + D_{d(z)}.$$

When light is directed through all the pixels z(n) of near screen 18, the images SL and SR are formed on the retinas of the viewer. The aim of the calculation is a optimizing of the calculated images on the near and distant screens 18 and 22 to obtain $$SL \rightarrow L, \text{ and}$$

$$SR \rightarrow R.$$

One can prove that it is impossible to obtain an exact solution for the arbitrary L and R images. That is why the present invention seeks to find an approximated solution in the possible distributions for N and D to produce a minimum quadratic disparity function (between target and calculated images):

$$\rho(SL - L) \underset{N,D}{\longrightarrow} \min$$

$$\rho(SR - R) \underset{N,D}{\longrightarrow} \min$$

where ρ(x) is a function of the disparity, with the limitation of pixel intensity to 0≦N≦255, 0≦D≦255 for constant M.

An artificial Neural Network ("NN"), such as described below with respect to FIG. 9, may be used for this problem solving because of the following specific features: parallel processing and DSP integrated scheme application.

Figure 8:
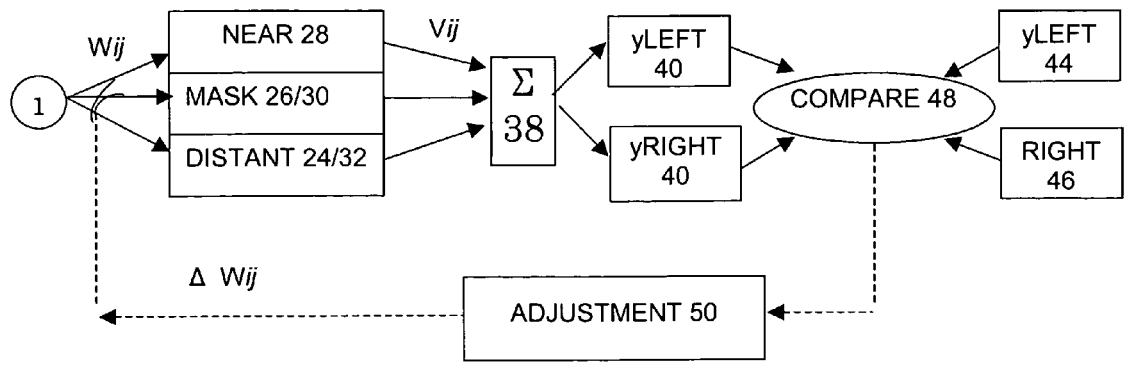
FIG. 8 is a logical and schematic flow diagram illustrating the data flow for the operation of the display control program in accordance with embodiments of the invention.

Referring now to FIG. 8, the data flow for the manipulation of the images of the present invention is illustrated. As noted earlier the memory unit 12, processor 14, and LCD control and luminous control 16 regulate the luminous radiation emanating from the distant screen 22 and the transmissivity of the mask 20 and near screen 18.

Information concerning multiple discreet two dimensional (2-D) images (i.e., multiple calculated images) of an object, each of which is depicted in multiple different areas on the LCD screens, and, optionally, information about positions of the right and left eyes of the viewer are adjusted by the processor block 14.

Signals corresponding to the transmission of a portion 28 of near screen 18, the transmissivity of mask 20 corresponding to the left and right eye respectively (26, 30) and the distant screen 22 corresponding to the luminous radiation of those portions of the image of the left and right eye respectively (24, 32) are input to the processor following the set program.

The light signals from the cells of all screens that are directed toward the right and left eye of each viewer are then identified. In this example signals from cell 28, 26, and 24, are all directed toward the left eye of the viewer 36 and signals from block 28, 30, and 32 are directed the right eye of the viewer 34.

Each of these left and right eye signals is summed 38 to create a value for the right eye 42 and the left eye 40. These signals are then compared in a compare operation 48 to the relevant parts of the image of each aspect and to the relevant areas of the image of the object aspects 44 and 46.

Keeping in mind that the signal is a function of the location of the viewer's eyes, the detected signal can vary to some extent. Any errors from the comparison are identified for each cell of each near mask, and distant screen. Each error is then compared to the set threshold signal and, if the error signal exceeds the set threshold signal, the processor control changes the signals corresponding to the luminous radiation of at least part of the distant screen 22 cells as well changes the transmissivity of at least part of the mask and near cells of the LCD displays.

If the information concerning the calculated images of the object changes, as a result of movement of the viewer position, the processor senses that movement and inputs into the memory unit signals corresponding to luminous radiation of the distant screen cells as well as the transmissivity of the mask and near screen cells until the information is modified. When the viewer position varies far enough to require a new view, that view or image is extracted from the database and processed.

Figure 9:
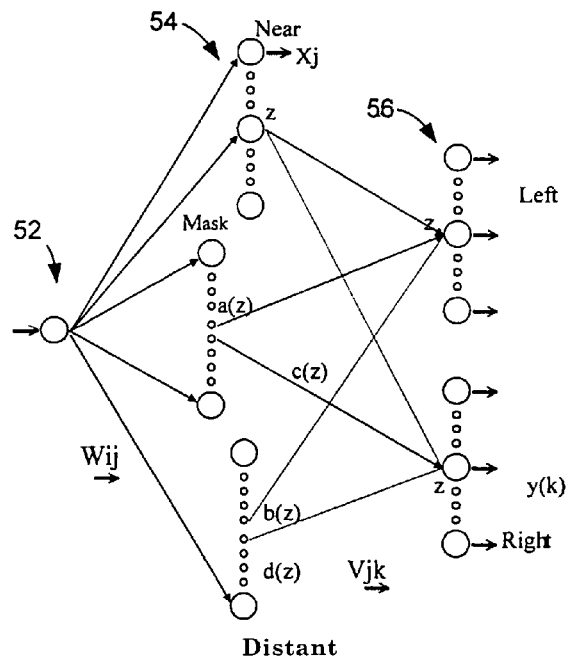
FIG. 9 is a schematic diagram illustrating a neural network diagram used to determine image data in accordance with an embodiment of the invention.

FIG. 9 shows a neural network architecture that is applied to the problem described above in accordance with an embodiment of the invention. In calculating the images on the far and near screens, it helps to assume that there are L and R, a left and a right pair of stereo source images, and a constant viewing-zone (assuming the viewers eye positions is constant). A spatial mask of an amplitude-type will be assumed for simplicity. The neural network of the invention replicates the function of the human eye by generating an image at the mid-point between two shown panels. To generate these images, the neural algorithm reduces the differences between the original light field of the object (the source images) and the panel generated light field. The difference between the light fields is called the maximum exactness (or minimum error), and is reduced until sufficient exactness within the range of human perception is achieved. The neural network architecture shown in FIG. 8 is a three layer neural network. An input layer 52 consists of one neuron that spreads the unit excitement to the neurons of the hidden layer 54. The neurons of the hidden layer 54 form three groups that correspond to the near and distant screens and the mask. The neurons of an output layer 56 forms two groups that correspond to images SL and SR. The number of neurons corresponds to the number of LCD screens pixels. Synaptic weights Wij that corresponds to the near and distant screens is an adjusting parameter, and Wij of the mask is a constant. Synaptic interconnection between hidden layer neurons corresponds to the optical scheme of the system:

$$V_{j,k} = \begin{cases} 1 & \text{-if } j = k \text{ \& } k, a(k), b(k) \text{ is on the same line} \\ & \text{or } j = k \text{ \& } k, c(z), d(z) \text{ is on the same line} \\ 0 & \text{-otherwise} \end{cases}$$

Nonlinear functions are a sigmoid function in the value [0–255]:

$$F(x) = \frac{255}{1 + \exp(-x)}.$$

The functioning of the NN can be described by:

$$X_j = F\left(\sum_j W_{ij} Inp_i\right) = F(W_{1j})$$

$$= \begin{cases} D_j & \text{- if } j \in D \\ M_j & \text{- if } j \in M \text{ - output of hidden layer} \\ N_j & \text{- if } j \in N \end{cases}$$

$$Y_k = F\left(\sum_k V_{ik} X_j\right) \text{ - output of the NN.}$$

The output signal in any neuron is a summation of at least one signal from the distant and near screens and the mask. The output of the NN corresponding to the left and right eye of the viewer, is $$Y_k(\text{left}) = F(X_z + X_{a(z)} + X_{b(z)}) = F(N_z + M_{a(z)} + D_{b(z)})$$

$$Y_k(\text{right}) = F(X_z + X_{c(z)} + X_{d(z)}) = F(N_z + M_{c(z)} + D_{d(z)})$$

The error function is:

$$E = \sum_k \rho(Y_k(\text{left}) - L_k) + \sum_k \rho(Y_k(\text{right}) - R_k)$$

that is the summation of all the errors. From above, it is evident that when E→0 while NN learning, the output of the hidden layer will correspond to the desired calculated images to be illuminated on the screens.

NN Learning.

In the initial step, the weights Wij have random values. A back propagation method (BackProp) was used to teach the NN:

$$W_{ij}(\text{new}) = W_{ij}(\text{old}) - \alpha \frac{dE}{dW_{ij}}$$

where α accounts for the velocity of the learning. The experiments show that an acceptable accuracy was obtained at 10–15 iterations, for some images the extremely low errors can be achieved in 100 iterations. The calculations show the strong dependence between the level of errors and the parameters of the optical scheme, such as the shape of the L and R images, the distance between the near and distant screens and the mask, and the viewer eye position.

For obtaining more stable solutions for small variations of the optical parameters, two alternative methods can be used. The first method involves modification of the error function, by adding a regularization term:

$$E = \sum_k \rho(Y_k(\text{left}) - L_k) + \sum_k \rho(Y_k(\text{right}) - R_k) + \beta \frac{W_{ij}^2}{2}$$

where β—is a regularization parameter.

The second method involves randomly changing the position of the viewer eye by a small amount during the training of the NN. Both of these methods can be used for enlarging of the area of stereo viewing.

Training methods other than "BackProp" can also be used, for example, a conjugated gradients method:

$$W_{ij}(t) = W_{ij}(t-1) + \alpha(t)S_{ij}(t-1),$$

$$S_{i,j}(t) = -G_{ij}(t) + \frac{\|G_{ij}(t)\|^2}{\|G_{ij}(t-1)\|^2} S_{ij}(t-1)$$

$$G_{ij}(t) = \frac{dE}{dW_{ij}}$$

which is a variant of Fletcher-Reeves. This will accelerate the training procedure 5–10 times.

A typical system to employ the present invention consists of two 15" (or larger) AM liquid crystal displays having a resolution of 1024×768 or greater, and a computer system, preferably using an Intel Pentium III-500 MHz equivalent or faster processor, for stereo image processing. In such a 15" system, preferably the distance between the panels is approximately 5 mm, and the mask comprises a diffuser. A suitable diffuser type is a Gam fusion number 10–60, made available by Premier Lighting of Van Nuys, Calif., which has approximately a 75% transmission for spot intensity beams as less diffusion may lead to visible moiré patterns. The computer emulates the neural network for obtaining the calculated images that must be illuminated on the near and distant screens in order to obtain separated left-right images in predefined areas. The neural network emulates the optical interaction of the displayed derived images as described above and takes into account the viewer's eye position in order to minimize the errors in the stereo image and dynamically produce a perceived 3-D image.

Given the compact nature of the arrangement of multiple liquid crystal display panels, and potentially a diffuser, in certain embodiments of the invention, it is important to provide suitable cooling for the panels to prevent overheating. One way suitable cooling can be provided is by utilizing an arrangement of fans within the display casing (which typically, in commercial embodiments, would encase at least the display panels and light source) to provide a cooling cross-flow of air.

As described above, the inclusion of a means for inputting a viewer position signal enables display systems according to the present invention to use both a set image viewing zone (or zones) or no zones that allow viewers to move without losing 3-D effect. The algorithms used to determine components of the derived images (such as SL and SR above) use variables for the optical geometry, and the viewer position signal is used to determine those variables. Also, the viewer position signal may be used to determine which stereopair to display, based on the optical geometry calculation, when the display is in a mode that allows viewer position changes to change the image view or perspective seen by the viewer. Numerous known technologies can be used for generating the viewer position signal, including known head/eye tracking systems employed for virtual reality (VR) applications, such as, but not limited to, viewer mounted RF sensors, triangulated IR and ultrasound systems, and camera-based machine vision using video analysis of image data.

The signals corresponding to the transmissivity of the near and distant screens' cells are input into the memory unit by means of the processor following the set program. The next step is to identify the light signals that can be directed from the cells of all the screens towards the right and left eyes of at least one viewer. Then compare the identified light signals directed towards each eye to the corresponding areas of the set 2-D stereopair images of the relevant object.

For each cell of each screen, the error signal is identified between the identified light signal that can be directed towards the relevant eye and the identified relevant area of the stereo picture of the relevant object aspect that the same eye should see. Each received error signal is compared to the set threshold signal. If the error signal exceeds the set threshold signal, the mentioned program of the processor control modifies the signals corresponding to the screen cells. The above process is repeated until the error signal becomes lower than the set threshold signal or the set time period is up.

It is also possible to solve the calculations for the case of two (or more) different objects reconstructed in two (or more) different directions for two (or more) viewers. It must be mentioned specifically that all calculations can be performed in parallel utilizing, for example, DSP processors designed for this purpose. Thus, the present invention can be used for multi-viewing display emulation. It should also be noted that the system of the present invention may also be used with multiple viewers observing imagery simultaneously. The system simply recognizes the individual viewers' positions (or sets specific viewing zones) and displays images appropriate for the multiple viewers.

The algorithm in accordance with the invention can be adapted for use with different hardware configurations including a computer central processing unit (e.g. Intel chips) and 3-D video cards (e.g., nVidia GeForce, or ATI Radeon) supporting dual monitor configurations. Furthermore, hardware such as known 3-D accelerators can be used operate the algorithm more quickly.

As will be readily appreciated by one skilled in the area, 3-D displays created according to the principles of the present invention can be adapted to operate in several different modes. Such displays can work in stereo and multi-zone modes (M screens to provide views to N zones), in a more traditional electronic parallax barrier or lenticular stereo display mode, a dynamic noise stereo display mode (i.e., providing dynamic noise in a front screen and calculated images in second screen), a RF secure display mode (i.e., placing a specialized image in the front panel to make the back image visible for user, but invisible for radio-frequency screening) and a multi-user/multi-view (or "Family") display mode. Further, the 3-D images produced by the present invention can be further enhanced by application of known regularization processes.

Figure 10:
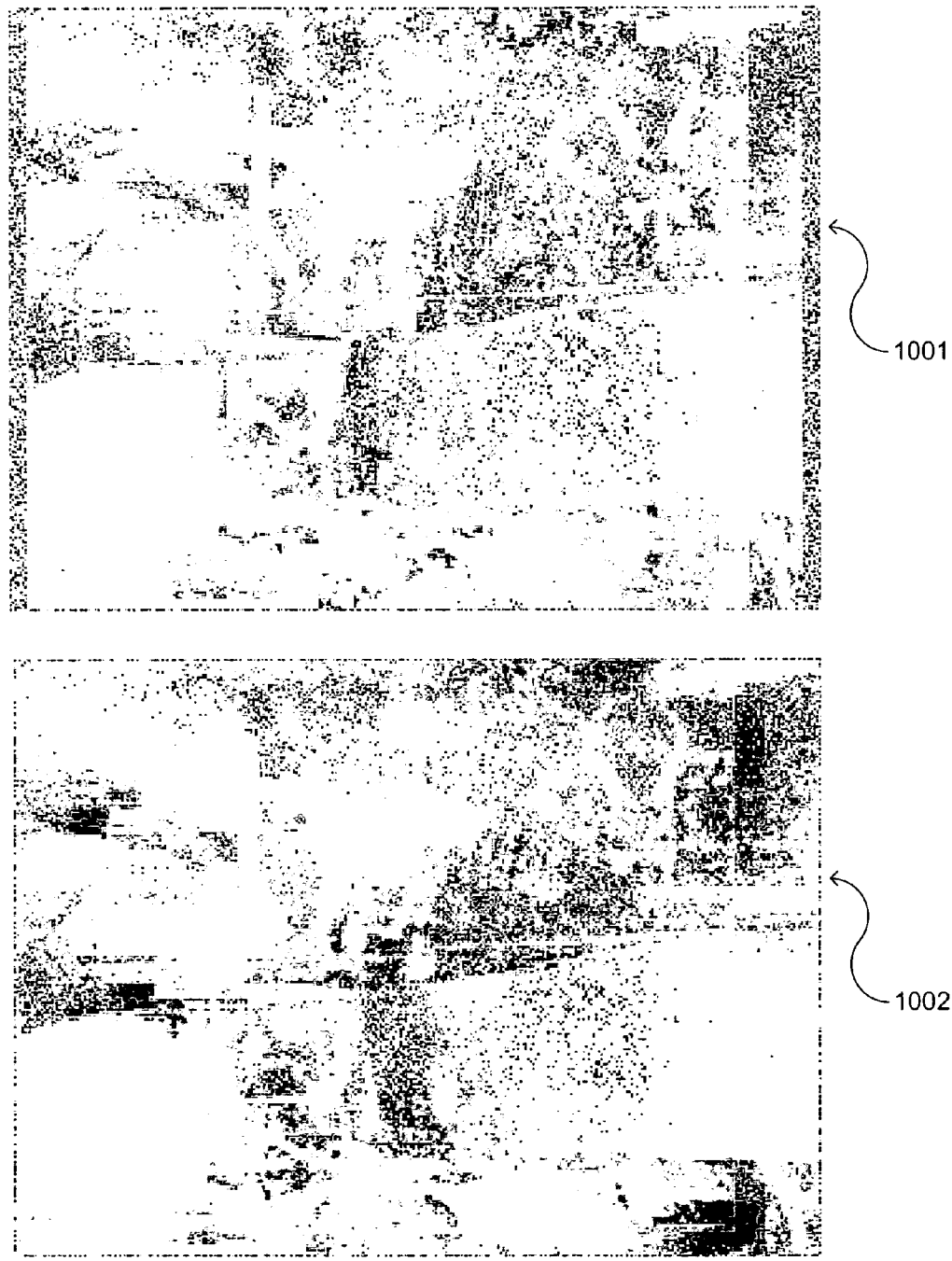
FIG. 10 and FIG. 11 are illustrations of exemplary images produced utilizing the multi-user and multi-view mode of a display for generating 3D images in accordance with certain embodiments of the invention.
Figure 11:
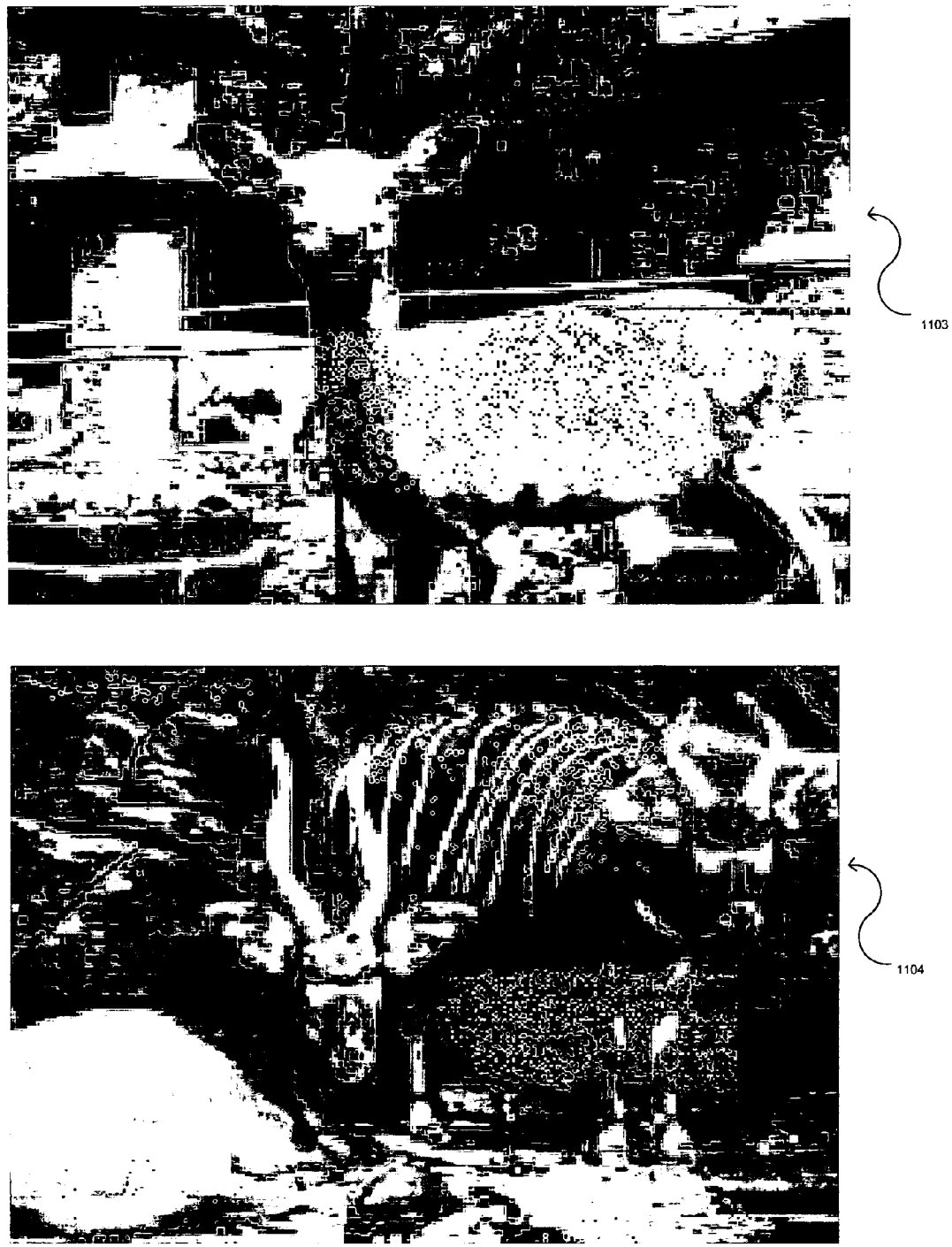

FIGS. 10 and 11 provide illustrations of the images encountered in a "Family" mode display. In this example, different members of a viewing group (e.g. where the group is a "family") each see different aspects of the same image, or different images altogether, based on any number of factors such as, but not limited to viewing location or angle. As depicted in FIG. 10, the derived images 1001 and 1002 actually displayed on the panels create a completely different perceived image 1103 for the first viewer (see FIG. 11), located at a first viewing position, and a second perceived image 1104 for a second viewer, located at a viewing position different from the first viewing position. The images for each viewer can both be stereoscopic (3-D), both be two-dimensional, or be a mixture of the two. As the number of viewers and different independent views increases, improved image quality can be obtained by increasing the number of display panels to increase the overall amount of image data that can be relayed to the viewers.

As will be readily appreciated by one skilled in the art, in certain embodiments of the invention, the light source can be a substantially broadband white-light source, such as an incandescent lamp, an induction lamp, a fluorescent lamp, or an arc lamp, among others. In other embodiments, light source could be a set of single-color sources with different colors, such as red, green, and blue. These sources may be light emitting diodes ("LEDs"), laser diodes, or other monochromatic and/or coherent sources.

In embodiments of the invention, the liquid crystal display panels comprise switchable elements. As is known in the art, by adjusting the electric field applied to each of the individual color panel pairs, the system then provides a means for color balancing the light obtained from light source. In another embodiment, each color panel system can be used for sequential color switching. In this embodiment, the panel pairs include red, blue, and green switchable panel pairs. Each set of these panel pairs is activated one at a time in sequence, and display cycles through blue, green, and red components of an image to be displayed. The panel pairs and corresponding light sources are switched synchronously with the image on display at a rate that is fast compared with the integration time of the human eye (less than 100 microseconds). Understandably, it is then possible to use a single pair of monochromatic displays to provide a color three-dimensional image.

This technique improves the image quality in comparison with parallax barrier systems due to the total use of the cells of all the screens for the information transmission. The present system can also identify the number of the viewers as well as the positions of the right and left eyes of each viewer and perform the above-mentioned procedures to realize the techniques in accordance with the identified eye positions of all the viewers. Such a system makes it possible for several viewers to receive visual information with the perception of the stereoscopic effect simultaneously.

A system and method for the viewing of stereo imagery has now been shown. It will be apparent to those skilled in the art that other embodiments of the present invention are possible without departing from the scope of the invention as disclosed.

What is claimed is:

1. A method of creating a three-dimensional image display, comprising:
   determining at least one viewing zone located in front of at least two transmissive electronic displays, said displays spaced one in front of another relative to said viewing zone;
   selecting one pair of source stereopair images;
   processing said source stereopair images to produce two calculated images derived from said source stereopair images and said relationship of said viewing zone and said displays, said calculated images being derived so that they act as a mask for each other when imaged on said displays, a first one of said calculated images being adapted for a front one of said two transmissive electronic displays and a second one of said two calculated images being adapted for a rear one of said transmissive electronic displays;
   displaying each said calculated images on an appropriate transmissive electronic display such that each displayed calculated image acts as a mask for the other displayed calculated image; and
   backlighting said transmissive electronic displays to display a stereoscopic image visible in said at least one viewing zone wherein said visible image corresponds to said selected pair of source stereopair images.

2. The method of claim 1, wherein processing for each said calculated image comprises iteratively:
   estimating the light directed to each one of a viewer's eyes by calculating interim calculated images for each of said transmissive electronic displays, and then determining the light directed through each discrete pixel of said front transmissive electronic display;
   comparing the estimated light for each pixel with the equivalent light from the selected one of said stereopair images to determine an error;
   adjusting said interim calculated images to reduce said error; and
   accepting said interim calculated images as said calculated images once said error for each pixel is below a set limit.

3. The method of claim 2, wherein said processing of said selected source stereopair images is performed by an artificial neural network.

4. The method of claim 1, wherein said at least one viewing zone is determined by a calculation responsive to a sensed viewer position signal.

5. The method of claim 1, wherein said at least one viewing zone is continuously monitored by an automated viewer position sensor that generates a signal used in producing said calculated images.

6. The method of claim 1, wherein said calculated images are processed according to a plurality of viewing zones.

7. The method of claim 1, further comprising selecting a plurality of said stored stereopair images for display to a plurality of viewing zones, and wherein said two calculated images are produced by processing said selected stereopair images.

8. The method of claim 1, further comprising positioning a mask between said transmissive electronic displays, wherein said mask is adapted to suppress Moiré patterns.

9. The method of claim 8, wherein said mask comprises a diffuser.

10. The method of claim 1, wherein said displays are selected from the group consisting of liquid crystal displays, gas plasma displays, organic light emitting diode displays and organic light emitting polymer displays.

11. The method of claim 1, wherein said selecting of said source stereopair images is performed according to said determined viewing zone, and wherein movements of said selected viewing zone impacts said selecting of said one of said stereopair images.

12. The method of claim 1, wherein said viewing zone is determined automatically to correspond to a variable position of an intended viewer of said visible image, and wherein said selected source stereopair images are changed as the position of said viewer varies.

13. The method of claim 12, wherein said changing of said source stereopair images comprises selecting a different source stereopair that corresponds to a different perspective of said selected source stereopair.

14. The method of claim 11, wherein said changing of said source stereopair images comprises selecting a different source stereopair that corresponds to a different perspective of said selected source stereopair.

15. The method of claim 1, further comprising determining at least two viewing zones and selecting at least two pairs of source stereopair images, a first pair of said selected source stereopair images corresponding to a first determined viewing zone and a second pair of said selected source stereopair images corresponding to a second determined viewing zone such that said calculated stereopair images causes said displays to create two different visible stereoscopic images, a different one of said two different stereoscopic images being visible in each said at least two viewing zones wherein said visible images corresponds to said selected pairs of source stereopair images.

16. A dynamic three-dimensional image display, comprising:
   a source of stereopair images;
   at least two electronic transmissive displays, said displays spaced one in front of another relative to a display viewing area;
   an illumination source to backlight said transmissive electronic displays to said display viewing area;
   a processor; and
   a video controller electronically interfaced with said displays, said illumination source and said processor;
   wherein said processor operates logic adapted to determine at least one viewing zone within said viewing area, to select a pair of source stereopair images, and to produce two calculated images derived from said source stereopair images and said relationship of said viewing zone and said displays, said calculated images being derived so that they act as a mask for each other when imaged on said displays, a first one of said calculated images being adapted for a front one of said two transmissive electronic displays and a second one of said two calculated images being adapted for a rear one of said transmissive electronic displays; and wherein said video controller receives calculated image data from said processor and causes each display to generate an appropriate one of said calculated images such that each displayed calculated image acts as a mask for the other displayed calculated image to display an three-dimensional image visible in said at least one viewing zone, said visible image corresponding to said selected pair of source stereopair images.

17. The display of claim 16, wherein said processor logic for deriving each said calculated image comprises the iterative process of:

estimating the light directed to each one of a viewer's eyes by calculating interim calculated images for each of said electronic transmissive displays, and then determine the light directed through each discrete pixel of said front electronic transmissive display;

comparing the estimated light for each pixel with the equivalent light from the selected ones of said stereopair images to determine an error;

adjusting said interim calculated images to reduce said error; and accepting said interim calculated images as said calculated images once said error for each pixel is below a set limit.

18. The display of claim 17, wherein said means for processor logic for deriving each said calculated image is performed by said processor by emulating an artificial neural network.

19. The display of claim 16, further comprising a viewer position sensor that provides a signal for said processor to determine said least one viewing zone based upon the sensed position of a viewer.

20. The display of claim 19, wherein selecting of said source stereopair images is dependent upon a location of said determined viewing zone, and wherein movements of said selected viewing zone impacts said selecting of said one of said stereopair images.

21. The display of claim 16, wherein said viewing zone is a stationary viewing zone preset in a memory accessible by said processor.

22. The display of claim 16, wherein said processor logic derives said calculated images such that they can be displayed to a plurality of viewing zones to create an three-dimensional image visible in each of said plurality of viewing zones.

23. The display of claim 16, wherein said processor logic for selecting is adapted to select a plurality of said stereopair images, and where said means for processing is further adapted to process said plurality of selected stereopair images to calculate said calculated images such that they can be displayed to a plurality of viewing zones to create a plurality of aspects of a three dimensional image visible in said viewing zones.

24. The display of claim 16, further comprising a mask positioned between said electronic transmissive displays, wherein said mask is adapted to suppress Moiré patterns.

25. The display of claim 24, wherein said mask is a diffuser.

26. The display of claim 16, wherein said displays are selected from the group consisting of liquid crystal displays, gas plasma displays, organic light emitting diode displays and organic light emitting polymer displays.

27. The display of claim 16, wherein said viewing zone is determined automatically to correspond to a variable position of an intended viewer of said visible image, and wherein said selected source stereopair images are changed by said processor as the position of said viewer varies.

28. The display of claim 27, wherein said processor changes said source stereopair images by selecting a different source stereopair that corresponds to a different perspective of said selected source stereopair.

29. The display of claim 27, wherein said changing of said source stereopair images comprises selecting a different source stereopair that corresponds to a different perspective of said selected source stereopair.

30. The display of claim 16, wherein said processor logic is further adapted to determine at least two viewing zones within said viewing area and to select at least two pairs of source stereopair images, a first pair of said selected source stereopair images corresponding to a first determined viewing zone and a second pair of said selected source stereopair images corresponding to a second determined viewing zone such that said calculated stereopair images causes said displays to create two different visible stereoscopic images, a different one of said two different stereoscopic images being visible in each said at least two viewing zones wherein said visible images corresponds to said selected pairs of source stereopair images.

31. The display of claim 16, further comprising a memory in communication with said processor; said memory containing a database of various pairs of source stereoscopic images.

32. The display of claim 16, further comprising a mechanism for receiving source stereoscopic images input selected from the group consisting of one or more pairs paired video streams, one or more paired images of objects, and one or more paired views of 3-D scenes.

* * * * *